Patented Dec. 29, 1925.

1,567,395

UNITED STATES PATENT OFFICE.

ALBERT SCHMIDT, OF PARIS, FRANCE.

PROCESS OF CHLORINATION OF SULPHITE LIQUOR.

No Drawing.  Application filed March 30, 1922. Serial No. 548,184.

*To all whom it may concern:*

Be it known that I, ALBERT SCHMIDT, a citizen of the Republic of France, and a resident of Paris, France, have invented certain new and useful Improvements in Processes of Chlorination of Sulphite Liquor; and I do hereby declare the following to be a full, clear, and exact description of the invention, such as will enable others skilled in the art to which it appertains to make and use the same.

The chlorination of sulphite liquor has been the subject of various attempts. Furthermore, according to the Austrian patent Schweinsburg No. 14,423 of June 27th, 1902, it was proposed to prepare a glue dissolved in water, wherein is boiled the crude liquor together with chlorates and mineral acids until it is shown by a test portion withdrawn from the liquid shows that a complete destruction of the tanning acids has taken place; then the liquor which is thus purified is heated to dryness together with proteic substances.

But the said process has this particular feature that the alleged chlorination will lead necessarily to the total destruction of the tanning substance before the subsequent glue treatment takes place.

My invention differs essentially from the first of the two processes in that the nascent chlorine does not effect the total destruction of the organic matter, but on the contrary a chlorination of the latter. This chlorination may be increased without difficulty by a hot treatment, so that the product of the reaction when in the dry state will contain as much as 30% of chlorine. On the contrary, the chlorination with chloride of lime and hydrochloric acid will only afford 5.8% of chlorine, with which the valuable properties inherent in strongly chlorinated bodies will not be made manifest.

In the process according to my invention, the operation is performed as follows. In the sulphite liquor, after the separation of sugar and the reduction of the volume to one-half by evaporation, a current of chlorine is sent through, the liquid is separated from the precipitate formed, and the bath is treated in the hot state, with a chlorate and hydrochloric acid. This will afford bodies of a reddish-yellow colour which are soluble and contain as much as 30% or more of chlorine, but which however are of a very stable character. They are of an acid nature forming soluble alkaline salts and salts of heavy metals, which are partially insoluble. They may be employed as tanning material and as substitutes for natural resins, and the like.

The said process also constitutes a method for separating from the liquid in the sulphite liquor the organic substances having any value and enabling the use of waste material which was hitherto of a very troublesome nature.

In the first place, I evaporate in the cold and to a degree of concentration of 25%, 500 kilograms of sulphite liquor, and then treat the same in the hot state for some two hours with chlorine gas. The resulting precipitate is separated from the liquid and is treated by chlorate and hydrochlorate acid until the proportion of chlorine in the product of the reaction, in the dry state, attains 20%.

What I claim is:—

1. The method of chlorinating sulphite liquor which comprises first treating the liquor with chlorine gas and then treating the resultant precipitate with nascent chlorine.

2. The method of chlorinating sulphite liquor, which comprises reducing the volume of the liquor, treating the hot liquor with chlorine gas, then treating the resulting precipitate with a chlorate and hydrochloric acid.

3. In the method of chlorinating sulphite liquors the step of treating the liquor without previous neutralization with chlorine gas.

In testimony that I claim the foregoing as my invention, I have signed my name hereto.

DR. ALBERT SCHMIDT.